(12) United States Patent
Soppelsa

(10) Patent No.: US 7,064,911 B2
(45) Date of Patent: Jun. 20, 2006

(54) GUIDE SYSTEM FOR OPTICAL SYSTEMS, PARTICULARLY ZOOM SYSTEMS

(75) Inventor: Peter Soppelsa, Balgach (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 0 days.

(21) Appl. No.: 10/922,691

(22) Filed: Aug. 20, 2004

(65) Prior Publication Data
US 2005/0046972 A1    Mar. 3, 2005

(30) Foreign Application Priority Data
Aug. 26, 2003 (DE) ................. 103 39 255

(51) Int. Cl.
G02B 7/02 (2006.01)
(52) U.S. Cl. .............. 359/823; 359/703; 359/704; 359/821
(58) Field of Classification Search ........... 359/696, 359/703, 704, 821, 823
See application file for complete search history.

(56) References Cited

U.S. PATENT DOCUMENTS

| | | | |
|---|---|---|---|
| 3,748,024 A | 7/1973 | Rodier et al. | |
| 4,322,151 A | 3/1982 | Weiss | |
| 4,998,357 A | 3/1991 | Farnung et al. | |
| 5,225,938 A * | 7/1993 | Nomura | 359/699 |
| 5,675,442 A | 10/1997 | Parks | |

FOREIGN PATENT DOCUMENTS

| | | |
|---|---|---|
| EP | 0 620 463 A1 | 10/1994 |
| GB | 1058001 | 2/1967 |
| JP | 57169708 A | 10/1982 |
| JP | 10177129 A | 6/1998 |
| JP | 11084210 A | 3/1999 |
| JP | 11305103 A | 11/1999 |

* cited by examiner

Primary Examiner—Hung Xuan Dang
Assistant Examiner—Joseph Martinez
(74) Attorney, Agent, or Firm—Hodgson Russ LLP

(57) ABSTRACT

The invention relates to a guide system for optical systems, particularly for zoom systems, with which optical assemblies such as lenses and/or sets of lenses can be moved along an optical axis (16). The proposed guide system comprises a housing (2) defining an internal diameter (1) and extending along the optical axis (16). A slide (3) is configured to accommodate an optical assembly (19) and has a sleeve segment (15) which has on its outside a plurality of contact surfaces (4) for abutment on the internal diameter (1) of the housing (2). For defined movement of the slide (3) along the optical axis (16) a drive unit (12) is provided. A device (17) serves to hold the sleeve segment (15) at the internal diameter (1), another device (18) serves to secure the slide (3) against rotation in the cross-sectional area of the housing. The guide system according to the invention provides guidance which is absolutely free from play and low in friction. Openings (10) in the housing allow access to the lenses for adjustment and cleaning.

15 Claims, 3 Drawing Sheets

GUIDE SYSTEM FOR OPTICAL SYSTEMS, PARTICULARLY ZOOM SYSTEMS

CROSS-REFERENCE TO RELATED APPLICATIONS

The present application claims priority of German patent application number 103 39 255.6 filed Aug. 26, 2003.

FIELD OF THE INVENTION

The invention relates to a guide system for optical systems, particularly zoom systems, in which optical assemblies such as lenses or sets of lenses are moved relative to one another. In a zoom system the individual zoom components which consist of individual lenses or sets of lenses are moved, for example, relative to one another along the optical axis of the zoom system. This requires a guide system which is part of the optical instrument. The optical instrument may be a zoom incorporated in a camera or in a microscope.

BACKGROUND OF THE INVENTION

Various constructions of guide systems of the mentioned kind are known, as described below.

Sleeves mounted co-axially about the optical axis and movable within one another and in the housing and each containing a zoom component may form the guide system of a zoom. As a rule there is substantial lateral clearance between the zoom components and the housing because of the total diametric tolerances. Moreover, in the case of sleeves with a short axial length, there is a risk of tilting the individual zoom components particularly when the sleeves are pushed into one another. On the other hand, a small diametric clearance means that the zoom components cannot move easily within the housing. After the sleeves with the zoom components have been built into the housing the lenses are no longer accessible so that it is not possible either to clean the lenses or to adjust the zoom components in the lateral or axial direction.

Another known zoom guiding system consists of guide columns arranged parallel to the optical axis on which slides move which accommodate the zoom components. One column acts as a guide column and another acts as a rotation preventer to prevent the zoom component from rotating about the optical axis. In this arrangement, narrow diametric tolerances have to be maintained in the columns and slides to avoid any play. Any flexing of the columns leads to guiding errors. In addition, narrow positional tolerances of the columns also have to be maintained. The slides which hold the zoom components have a complex geometry in this solution. As a result of the tolerance totals resulting from the complex structure for the position of the axis of the zoom components (optical axis), the zoom components have to be laterally adjustable.

Finally, a coaxially constructed guide system is known having disk-shaped slides which accommodate zoom lenses and which are supported for lateral positioning within the diameter of the inner wall of the housing. The actual guiding of these slides and precautions against tilting are provided by sets of three bolts arranged in the slide which pass through longitudinal slots in the housing and abut on a triple curve provided about the housing. This solution is also unable to prevent possible tilting of the zoom components as the result of unavoidable tolerances in the triple arrangement in spite of a more expensive circumferential curve. As a result of the diametric tolerances needed to permit movement there is a risk of lateral slippage of the zoom components which can only be counteracted by complex measures. Moreover, these disadvantages are a result of the unsatisfactory nature of the lenses, namely the impossibility of axial or lateral adjustment of the zoom components and the impossibility of cleaning the lenses once they have been installed.

U.S. Pat. No. 5,675,442 discloses a guide system for microscope lenses in which two guide rods guide one or more lens holders along an optical axis. A slide of a lens holder fits around one of the two guide rods in interlocking engagement and thus acts as a guide column. The other guide rod acts as a rotation preventer, the lens holder partially surrounding the guide rod. For this purpose the lens holder has, on the relevant side, a unshaped recess in which the guide rod engages. In order to avoid possible displacement within this recess a magnet is provided on one side of the recess which exerts a magnetic attracting force on the associated magnetisable guide rod so that the latter always abuts on the side of the U-shaped recess where the magnet is located.

The disadvantages connected with this solution have already been described above in connection with the second solution described.

SUMMARY OF THE INVENTION

The essential requirements made of the guide systems described can be summarized as follows:

Movement free from clearance (play) without tilting and/or slipping of the zoom components relative to the optical axis of the zoom, Ease of movement for user friendly operation (manual or powered), Accessibility of the zoom components for adjustment and cleaning and A compact and inexpensive design.

The above remarks obviously also apply to guide systems for other optical systems in which optical assemblies such as lenses or sets of lenses have to be moved in one direction and/or relative to one another.

One aim of the invention is to avoid the above-mentioned disadvantages of known guide systems. Moreover, the essential requirements set out above should be met as far as possible with the guide system proposed according to the invention.

A guide system is proposed according to the invention for optical systems, particularly zoom systems, with which optical assemblies such as lenses and/or sets of lenses are to be moved along an optical axis, the guide system having the following components: a housing which extends along the optical axis and defines an inner diameter; at least one slide for accommodating an optical assembly, this slide comprising, a sleeve segment which has on its exterior a plurality of contact surfaces for making contact with the internal diameter; at least one drive unit for defined movement of a slide along the optical axis; a device for securing the sleeve segment of the slide to the internal diameter and a device for securing a slide against rotation about the optical axis.

The advantages of the guide system according to the invention will be explained hereinafter with reference to a zoom system comprising individual zoom components which are to be moved relative to one another in a defined manner along the optical axis in order to produce variable magnification. However, the invention is by no means restricted to zoom systems of this kind but is equally relevant to other optical systems with corresponding optical assemblies.

In the guide system according to the invention longitudinal guiding is effected by the precise internal diameter which is defined by the housing. Slides with the zoom lenses are arranged in the housing. These slides are, however, not whole sleeves but rather comprise sleeve segments which abut with a plurality of contact surfaces on the inner diameter of the housing. One device holds the sleeve segment of a slide at the internal diameter while another device forms a rotation preventer to prevent rotation of the slide about the optical axis. The contact surfaces formed on the sleeve segment guide the slide along the optical axis and abut on the inside of the housing. This allows movement with low friction. A further advantage of these contact surfaces is that there is no need to construct the entire slide or the entire sleeve segment to fit precisely the internal diameter of the housing, but only the raised contact areas on the sleeve segment. The geometry of the housing determines the appropriate geometry of the contact areas which may also be in the form of points of contact where the contact with the interior of the housing is made at separate points.

The sleeve segments are long enough to overcome any danger of tilting of the zoom components. Since they are once again sleeve segments, two or more slides may be brought close together when for example one sleeve segment moves into the free space of the sleeve segment of another slide. Because the sleeve is not entirely closed, there is guaranteed access to the zoom lenses for cleaning and adjustment purposes. For these purposes the geometry of the housing must also allow access to the interior. The housing in the guide system according to the invention has only to define a precise internal diameter in order to guarantee accurate longitudinal guiding of the slides. For this purpose the housing may be cylindrical in shape, the internal diameter coinciding with the internal diameter of the cylinder, or may have rails extending in the axial direction which are arranged about an internal diameter, or may have two V-shaped surfaces arranged opposite each other which surround an internal diameter. In the latter two cases the sleeve segments abut with their contact surfaces at separate points on the rails or V-shaped surfaces.

In order to allow access to the zoom components the housing advantageously has at least one segment-like opening.

The invention makes it possible to construct a guide system for optical systems allowing easy movement of the optical assemblies and thus user-friendly operation, while giving access to the optical assemblies for adjustment and cleaning and ensuring movement free from backlash without tipping and/or slipping of the individual optical assemblies relative to the optical axis.

It is particularly advantageous if the sleeve segment of a slide has four contact surfaces. The contact surfaces are suitably located at the four corners of the sleeve segment. This ensures optimum abutment on the internal diameter while at the same time ensuring optimum protection from tilting.

It is also advantageous if the sleeve segment describes an arc of 180° or less, preferably 120° or 90°. This allows a long guide length in the axial direction—which is not the case with closed sleeves. The construction of the sleeve segments allows a plurality of sleeves to slide inside one another when the sleeve segments are arranged at different angular sectors about the optical axis, whereby the optical assemblies carried by the slides can be brought close to one another. The size of the arc of the sleeve segment may be selected according to the number of sleeves which are to be slid inside one another. It is advantageous, for example, when using two sleeve segments which are to be slid relative to one another, to construct them as 120° segments and arrange them so that they abut on sectors of the inner diameter of the housing facing one another at 180°.

It is advantageous to hold the sleeve segment of a slide against the housing at the internal diameter using magnetic forces. For this purpose the corresponding device comprises a magnet arranged outside the internal diameter, while the sleeve segment and/or the contact surfaces may be made of magnetisable material. The magnet arranged outside the internal diameter consequently pulls the sleeve segment against the housing at the internal diameter or against contact points of the housing on the internal diameter. It is sufficient if the contact surfaces of the sleeve segment are made of magnetisable material.

Alternatively, the device for holding a sleeve segment of a slide against the internal diameter contact points of the housing may expediently have a spindle which is connected at one end to the slide and/or its sleeve segment and accommodates a magnet at its other (distal) end. The magnet is moved in the axial direction together with the slide, the magnet and slide being firmly joined together by the common spindle. The magnetic force pulls the sleeve segment against the internal diameter, thus preventing the sleeve segment from tilting. The magnetic force acts between the magnet and a magnetisable material arranged further outwards in the radial direction, e.g. a steel strip extending axially and arranged close to the magnet. In this embodiment each slide has an associated device for securing the sleeve segment against the internal diameter.

It is advantageous in this respect if the housing has a longitudinal slot to allow axial movement of the slide together with a device for securing the sleeve segment of the slide. In the embodiment described above the spindle then passes through the longitudinal slot into the sleeve segment of the slide, for example, whereas outside the longitudinal slot is located the magnet fixed to the spindle. Any play of the spindle in the longitudinal slot which could lead to tilting is eliminated by the magnetic force.

It is also advantageous if the longitudinal slot in the housing is closed off to the outside by a steel strip to which the magnet attached to the above-mentioned spindle is attracted. In this case, during axial movement of the slide, the magnet travels along the steel strip at a small spacing therefrom. The hovering of the magnet above the steel strip does not generate any friction.

Furthermore, it is important to secure the slide against rotation about the optical axis. Such rotation could result in the drive unit no longer being able to pick up the slide in a defined manner. Such faults interfere with accurate guiding of the optical assemblies along the optical axis. As a compact construction is necessary, the drive units for the or each slide are generally mounted laterally of the slides in order to save space in the axial direction. The drive unit engages on one side of the slide via a coupling, enabling rotation to occur.

An advantageous device for securing a slide against rotation comprises a spindle connected to the slide at one end and accommodating a ball bearing at its other end, the ball bearing being arranged outside the internal diameter. For this purpose the housing has a longitudinal slot to allow axial movement of a slide together with said device for preventing rotation.

The ball bearing and longitudinal slot then form an ideal rotation preventer.

It is advantageous in this context to combine the device for securing the sleeve segment at the internal diameter and the device for preventing rotation. In the devices described above this can be achieved if the two devices share a common spindle which moves along a common longitudinal slot during axial movement of a slide. The spindle, which is connected to the slide or to the corresponding sleeve segment at one end, first of all accommodates a ball bearing at its other end, which moves in the longitudinal slot in the housing, and a magnet, for example, at the end of the spindle which is further away. As already mentioned above a steel strip may be provided at a small distance from these magnets, to cover the longitudinal slot on the outside.

In the guide system according to the invention the drive unit may be a spindle cam which drives the slide by means of a coupling. In order to achieve a guide system which is as compact as possible, the spindle cam is arranged peripherally between the internal and external diameters of the housing, viewed laterally from a slide, in a projection onto the cross section of the housing.

The various advantageous geometric shapes of the housing of the guide system have already been discussed above. A segment-like opening in the housing gives access to the optical assemblies (zoom lenses) for the purpose of adjustment and cleaning. Depending on the geometry of the housing, the segment-shaped opening is either already present or has to be provided in the housing.

BRIEF DESCRIPTION OF THE DRAWINGS

An embodiment exemplifying the invention and its advantages will be explained in more detail hereinafter with reference to the accompanying drawings, wherein.

DETAILED DESCRIPTION OF THE INVENTION

Figures 1A, 1B:
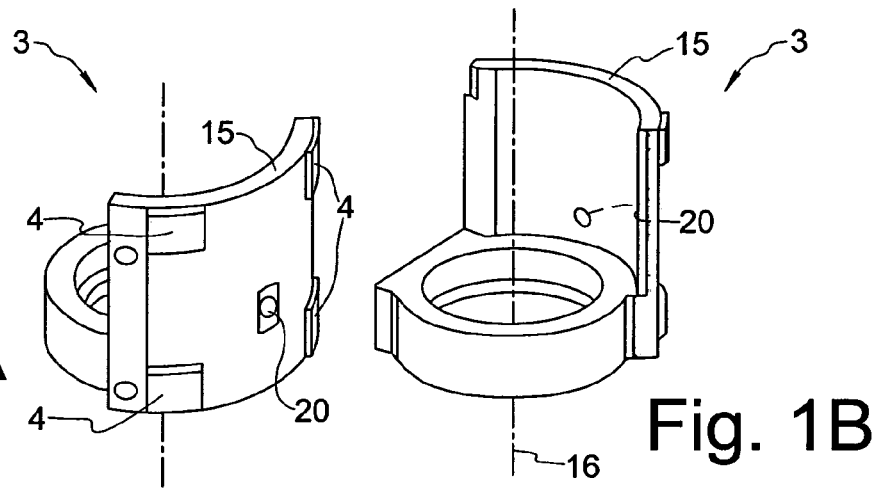
FIGS. 1A and 1B show two perspective diagrammatic views of a slide with a sleeve segment for a guide system according to the invention.

By way of example, a guide system for a zoom system according to the present invention will now be looked at more closely. A guide system of this kind has slides 3 each accommodating a zoom lens or set of zoom lenses. FIG. 1 diagrammatically shows a slide 3 of this kind from two different perspective views. The annular part of the slide 3 serves to hold a zoom lens or set of lenses and the slide 3 also comprises a sleeve segment 15 which in this initial example describes an arc of 120°. FIG. 1 also shows four raised contact surfaces 4 provided close to the corners of the sleeve segment. In the sleeve segment 15 there is a bore 20 for a spindle which carries the devices described hereinafter for holding the sleeve segment at the internal diameter of the housing and for securing a slide against rotation.

Figure 2:
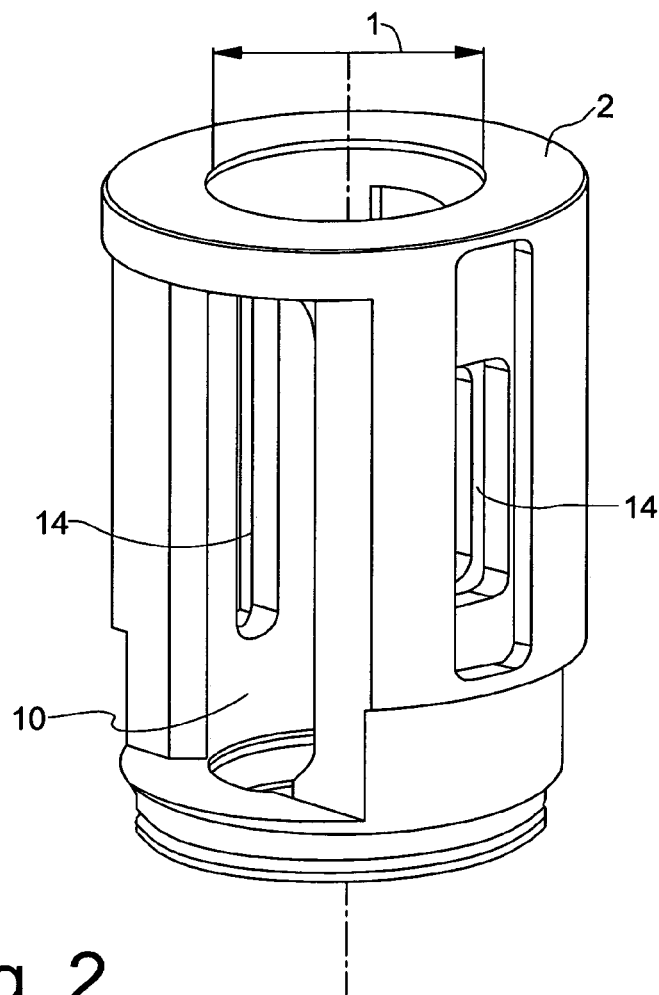
FIG. 2 shows an embodiment of a housing for a guide system according to the invention in diagrammatic perspective view.

FIG. 2 diagrammatically shows a housing 2 for a guide system according to the invention in perspective view. The housing, which is cylindrical in this instance, defines a precise internal diameter 1. Longitudinal slots 14 are formed in the cylinder casing of the housing 2, along which the slides 3 are guided in the axial direction inside the housing 2. Reference numeral 10 denotes a segment-shaped opening in the housing 2 which allows access to the optical assemblies for adjustment and cleaning purposes. With the housing 2 shown in FIG. 2 precise longitudinal guiding is possible thanks to the extremely precise internal diameter 1 which can be produced.

As already mentioned above, however, other shapes of housings 2 are conceivable which may define a precise internal diameter 1.

Figure 3:
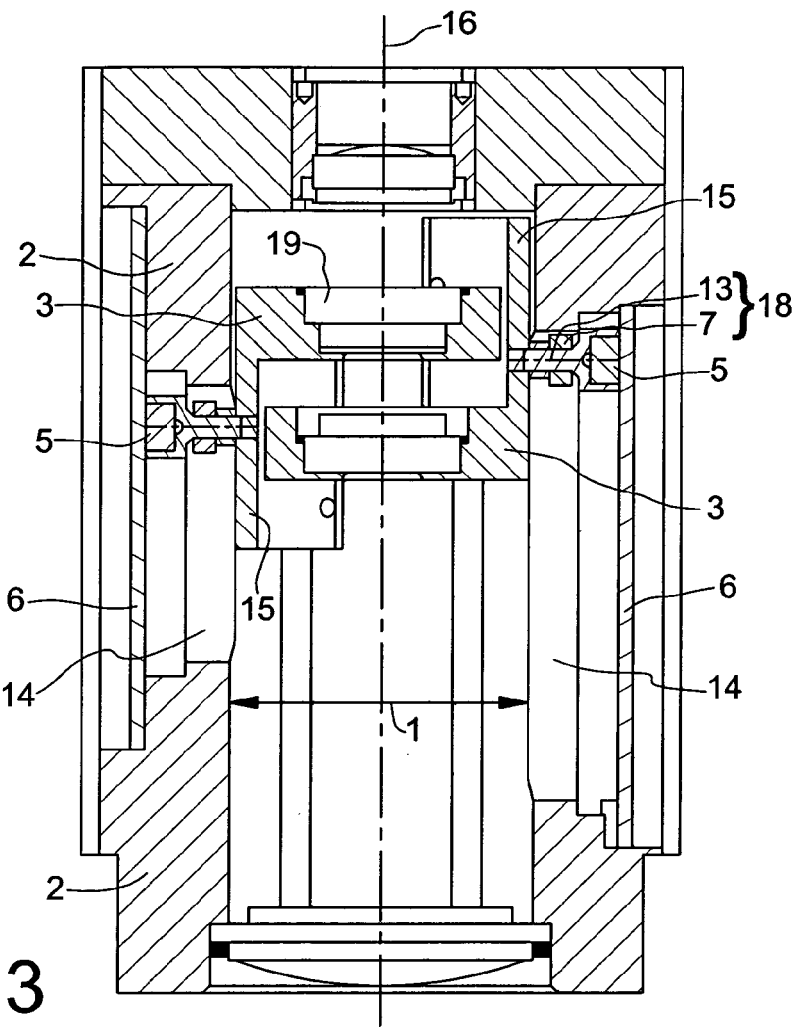
FIG. 3 shows a section along the longitudinal axis of a guide system according to the invention.

FIG. 3 now shows a cross-section through a guide system according to the invention in the axial direction. The housing 2 is shown, defining an internal diameter 1. The housing has longitudinal slots 14 along each of which is guided a slide 3 with a sleeve segment 15. A slide 3 carries a zoom component 19 consisting of a zoom lens or set of zoom lenses. The slide 3 is arranged with its sleeve segment 15 on the internal diameter 1 of the housing 2 such that the zoom lenses are moved precisely along the optical axis. This optical axis is designated 16.

In this embodiment the means for holding the sleeve segment 15 of the slide 3 at the internal diameter 1 of the housing and for securing the slide 3 against rotation are combined with one another and consist of a common spindle 13 which engages in the sleeve segment 15 through a bore 20 therein and on the outside of the internal diameter 1 carries a magnet 5 and a ball bearing 7. Each slide 3 and hence each zoom component is equipped with such a device. On moving in the axial direction the spindle 13 moves in a longitudinal slot 14 in the housing 2. The precise longitudinal slot 14 together with the ball bearing 7 forms the device 18 for rotation prevention. The magnet 5 and the steel strip 6 arranged at a small spacing therefrom ensure that the raised contact surfaces 4 are pulled-or-biased in a radial direction toward the housing 2 to hold the contact surfaces against the housing at the internal diameter 1 by a magnetic force. The raised contact surfaces 4 on the sleeve segments 15 are shown in FIG. 1. Together with the rotation preventer the zoom groups are precisely positioned with five degrees of freedom and are movable with absolutely no play along the sixth degree of freedom (axial longitudinal guide). The hovering of the magnets 5 over the steel strips 6 produces no friction.

Figure 4:
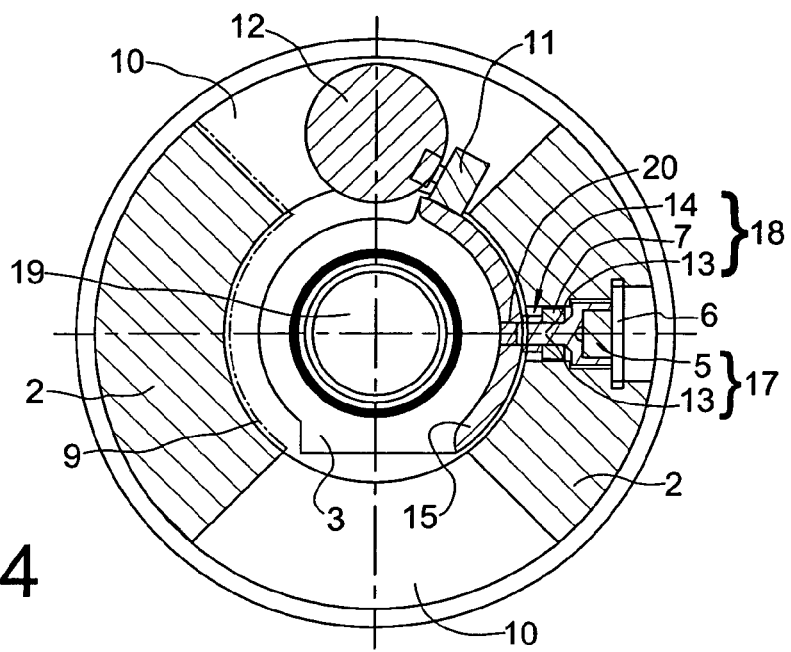
FIG. 4 shows a cross-section through the guide system according to FIG. 3.

The 120° sleeve segments 15 are arranged, in this embodiment, so as to abut on a sector 9 of the internal diameter 1 of the housing which is located at an angle of 180° opposite (see FIG. 4). Thus, unlike with closed sleeves, a long guide length in the axial direction is possible, thus allowing accurate guiding to be carried out.

FIG. 4 shows a cross-section through the guide system shown in FIG. 3 perpendicularly to the optical axis 16. A slide 3 is shown with a zoom lens 19 fitted therein, centred on the optical axis, and with the sleeve segment 15 (on the right hand side in FIG. 4). The housing defining the internal diameter 1 is designated 2. In the sectors of the internal diameter 1 of the housing 2 which are not used as a guide there are openings 10 which provide access to the zoom lenses 19 for adjustment and cleaning purposes and allow a drive unit to be mounted in a compact manner. The drive unit used is a spindle cam. 12 which drives the slide 3 via a coupling 11. In a spindle cam 12 of this kind the rotary movement of the spindle is converted via a steep thread into a linear movement, in this case in the axial direction. This form of drive with lateral coupling of the slide 3 causes forces to be produced which do not act only in the axial direction. Therefore rotation prevention must be provided to ensure precise movement in the axial direction.

FIG. 4 shows the ball bearing 7 which is accommodated by the spindle 13 and in the precise longitudinal slot 14 allows non-rotational movement of the slide 3 in the axial direction. As already described previously, a magnet 5 is provided to prevent tilting, this magnet being held by the same spindle 3 which is secured in a bore 20 in the sleeve segment 15. The magnetic force allows movement without play along the internal diameter 1. At a short distance from the magnet 5 is the steel strip 6 which closes off the longitudinal slot 14 to the outside and along which the magnet 5 moves without friction.

The guide system according to the invention makes it possible to use slides 3 which with their sleeve segments 15 provide a sufficient guide length and guide width as required for a stable system. At the same time the segment-shaped openings 10 in the housing 2 provide access to the slides 3 so that adjustments are possible in the direction of the optical axis and in the lateral direction. It is also possible to clean the lenses after they have been fitted.

The guide system according to the invention allows guiding to be carried out absolutely without play and with low friction, it has a compact and inexpensive coaxial construction and guarantees accessibility of the lenses.

The contact surfaces 4 on the sleeve segment 15 (cf. FIG. 1) can be produced in precise alignment with one another by inexpensive turning operations.

The four contact- surfaces 4 can be machined after the installation of the zoom sets so as to describe a cylinder the diameter of which exactly corresponds to the internal diameter 1 of the housing 2 and the axis of which coincides with the optical axis of the zoom component 19. Thus, lateral adjustment of the zoom components is unnecessary. It is only possible to make the diameters exactly equal because the segments 15 make contact only at the four contact surfaces 4. In this embodiment, the common guide surface for the two segments 15 is also utilised. In another embodiment the segments are configured such that the four surfaces 4 are part of a cylinder with exactly the same diameter as the internal diameter 1. The zoom components are fitted into the segments such that their optical axis coincides with the axis of the cylinder.

Figure 5:
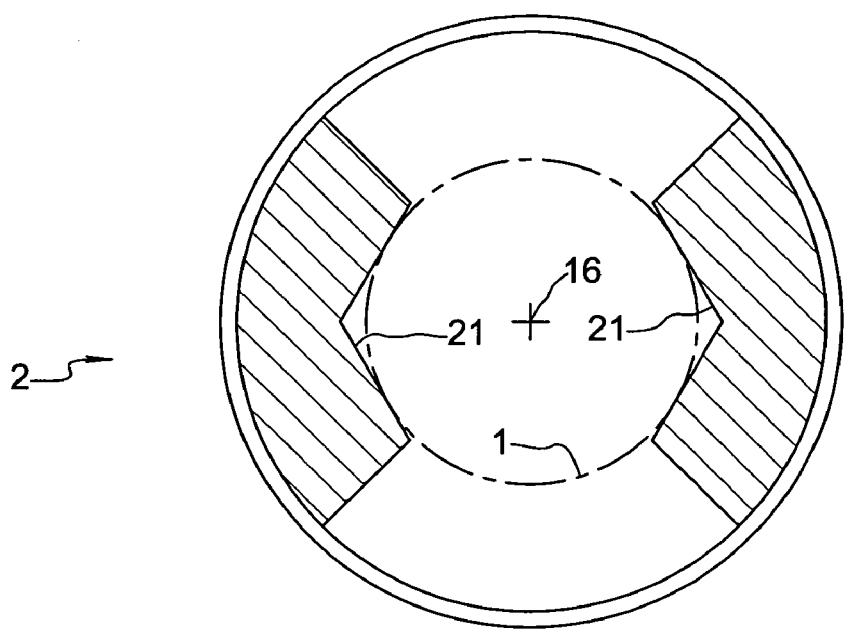
FIG. 5 shows a cross-section through another alternative embodiment of a housing for a guide system according to the invention, wherein the housing has a pair of opposing V-shaped surfaces extending parallel to an optical axis of the guide system.
Figure 6:
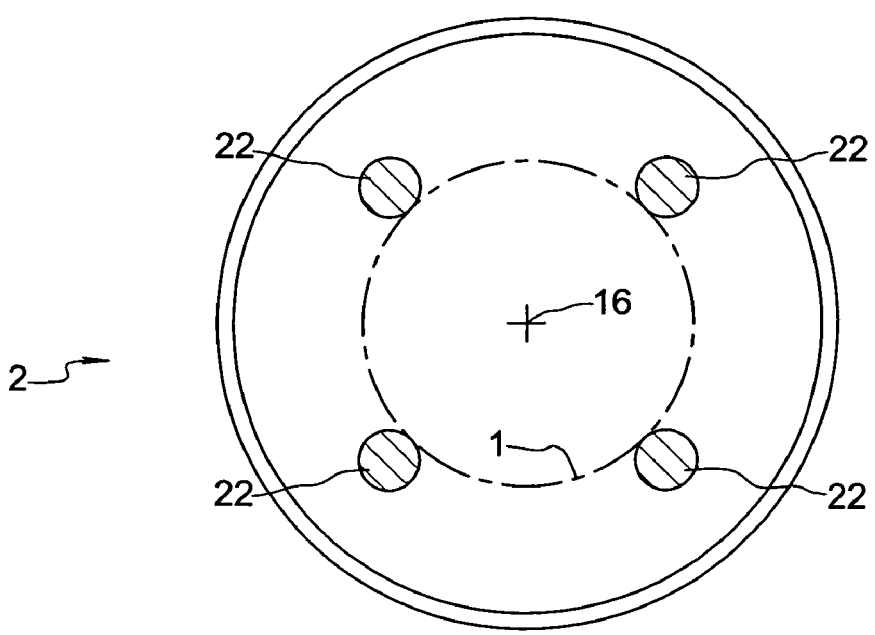
FIG. 6 shows a cross-section through an alternative embodiment of a housing for a guide system according to the invention, wherein the housing has a plurality of rails extending parallel to an optical axis of the guide system.

Additional alternatives with regard to the housing 2 are shown in FIGS. 5 and 6: Instead of the sectors of the internal diameter 1, two V-shaped surfaces 21 arranged parallel to the optical axis 16 may serve as guide surfaces. However in this case it should be noted that manufacturing with the required precision is more difficult. In addition, the total of four surfaces are difficult to arrange parallel and in the precise position so that they define a common optical axis for the zoom. The same is also true if guide columns are provided instead of the four guide surfaces. By contrast, there is the additional option of manufacturing four contact rails 22 to ensure precision in the manufacture of the internal diameter 1 by simple precision turning. The advantages of the ease of production of the precise slides 3 with their sleeve segments 15 are also retained in these alternative embodiments.

It should be stressed that the features of the guide system according to the invention discussed in this embodiment can be implemented not only in the combination shown but also in other arrangements, taken per se.

The invention is particularly suitable for zoom systems as used in microscopes. Obviously, they may also be used for stereomicroscopes with parallel-mounted zoom systems.

LIST OF REFERENCE NUMERALS

1 Internal diameter
2 Housing
3 Slide
4 Contact surfaces
5 Magnet
6 Steel strip
7 Ball bearings
8
9 Sector of the internal diameter
10 Opening of the housing
11 Coupling
12 Drive unit, spindle cam
13 Spindle
14 Longitudinal slot
15 Sleeve segment
16 Optical axis
17 Device for holding at the internal diameter
18 Device for rotation prevention
19 Optical assembly, zoom lens
20 Bore
21 V-shaped surface
22 Rail

What is claimed is:

1. A guide system for a zoom system for guiding movement of zoom components along an optical axis in relation to each other, the guide system comprising:
    a housing including a passage extending along the optical axis, the passage accommodating an internal diameter;
    at least two slides, each slide being adapted to hold one of the zoom components and including only one sleeve segment having an outer wall and a plurality of contact surfaces on the outer wall for abutment against an inner wall of the housing, the sleeve segment describing an arc of less than 180°;
    a spindle cam coupled to the at least two slides for moving the at least two slides along the optical axis, the spindle cam being arranged laterally of the at least two slides in an opening of the housing when the guide system is viewed in a cross-sectional plane perpendicular to the optical axis;
    means for biasing the plurality of contact surfaces of the sleeve segment in a radial direction for abutment with the inner wall of the housing; and
    means for securing the slide against rotation relative to the housing about the optical axis.

2. The guide system according to claim 1, wherein the sleeve segment comprises four contact surfaces on the outer wall.

3. The guide system according to claim 1, wherein the sleeve segment describes an arc of 120°.

4. The guide system according to claim 1, wherein the sleeve segment describes an arc of 90°.

5. The guide system according to claim 1, wherein the at least two slides have respective sleeve segments arranged to occupy different angular sectors about the optical axis.

6. The guide system according to claim 1, wherein the biasing means includes a magnet mounted outside of the passage and a magnetisable material included in the sleeve segment.

7. The guide system according to claim 6, wherein the plurality of contact surfaces are made of magnetisable material.

8. The guide system according to claim 1, wherein the biasing means includes a spindle extending radially from the corresponding slide and a magnet mounted at a distal end of the spindle.

9. The guide system according to claim 8, wherein the housing includes a longitudinal slot receiving the spindle to allow axially directed movement of the corresponding slide.

10. The guide system according to claim 9, wherein the longitudinal slot includes a steel strip.

11. The guide system according to claim 9, wherein a ball bearing is mounted on the spindle for engaging the longitudinal slot.

12. The guide system according to claim 1, wherein the housing is cylindrical.

13. The guide system according to claim 1, wherein the housing includes rails extending parallel to the optical axis and arranged around the internal diameter to define the passage.

14. The guide system according to claim 1, wherein the housing includes two opposing V-shaped surfaces extending parallel to the optical axis and arranged adjacent the internal diameter to define the passage.

15. The guide system according to claim 1, wherein housing includes at least one segment shaped opening allowing access to the passage.

* * * * *